United States Patent [19]

Murphy

[11] Patent Number: 4,664,444

[45] Date of Patent: May 12, 1987

[54] SEAT ASSEMBLY HAVING ADJUSTABLE THIGH SUPPORT

[75] Inventor: Randal T. Murphy, Farmington Hills, Mich.

[73] Assignee: Lear Siegler, Inc., Santa Monica, Calif.

[21] Appl. No.: 674,762

[22] Filed: Nov. 26, 1984

[51] Int. Cl.⁴ .............................................. A47C 7/02
[52] U.S. Cl. .................................... 297/284; 297/452; 297/458
[58] Field of Search .............. 297/284, 458, 312, 460, 297/337, 452

[56] References Cited

U.S. PATENT DOCUMENTS

| | | | |
|---|---|---|---|
| 3,095,188 | 6/1963 | Giese | 297/284 |
| 3,600,037 | 8/1971 | Lohr | 297/433 |
| 3,632,166 | 1/1972 | Lohr | 297/284 |
| 3,883,173 | 5/1975 | Shephard et al. | 297/284 X |
| 4,165,126 | 8/1979 | Strien et al. | 297/458 X |
| 4,324,431 | 4/1982 | Murphy et al. | 297/284 |
| 4,334,709 | 6/1982 | Akiyama et al. | 297/312 X |
| 4,455,047 | 6/1984 | Watanabe | 297/284 |
| 4,491,365 | 1/1985 | Muraicami | 297/284 X |

FOREIGN PATENT DOCUMENTS 36732 3/1983 Japan .................................. 297/312

Primary Examiner—Kenneth J. Dorner
Assistant Examiner—José V. Chen
Attorney, Agent, or Firm—Reising, Ethington, Barnard, Perry & Milton

[57] ABSTRACT

A seat assembly (10) comprising a seat portion (12) and back rest (14) supported on a seat frame (30) with a thigh support (26) movably supported forward of the seat portion (12). The thigh support (26) includes a support portion (42) extending from the seat frame (30) and a bolster (28) supported by the support portion (42). A spring arrangement (44) resiliently interconnects the support portion (42) and the bolster (26) for allowing movement of the entire bolster (26) relative to the support portion (42); for this purpose a pair of leaf springs (46) support the bolster portion (26) in a cantilevered fashion from the support portion (42) and are disposed adjacent each end of the bolster (28). A pair of slideways (52) and corresponding slide members (54) are secured to the frame structure, allowing the bolster (28) to extend between a fully extended to a fully retracted position.

21 Claims, 5 Drawing Figures

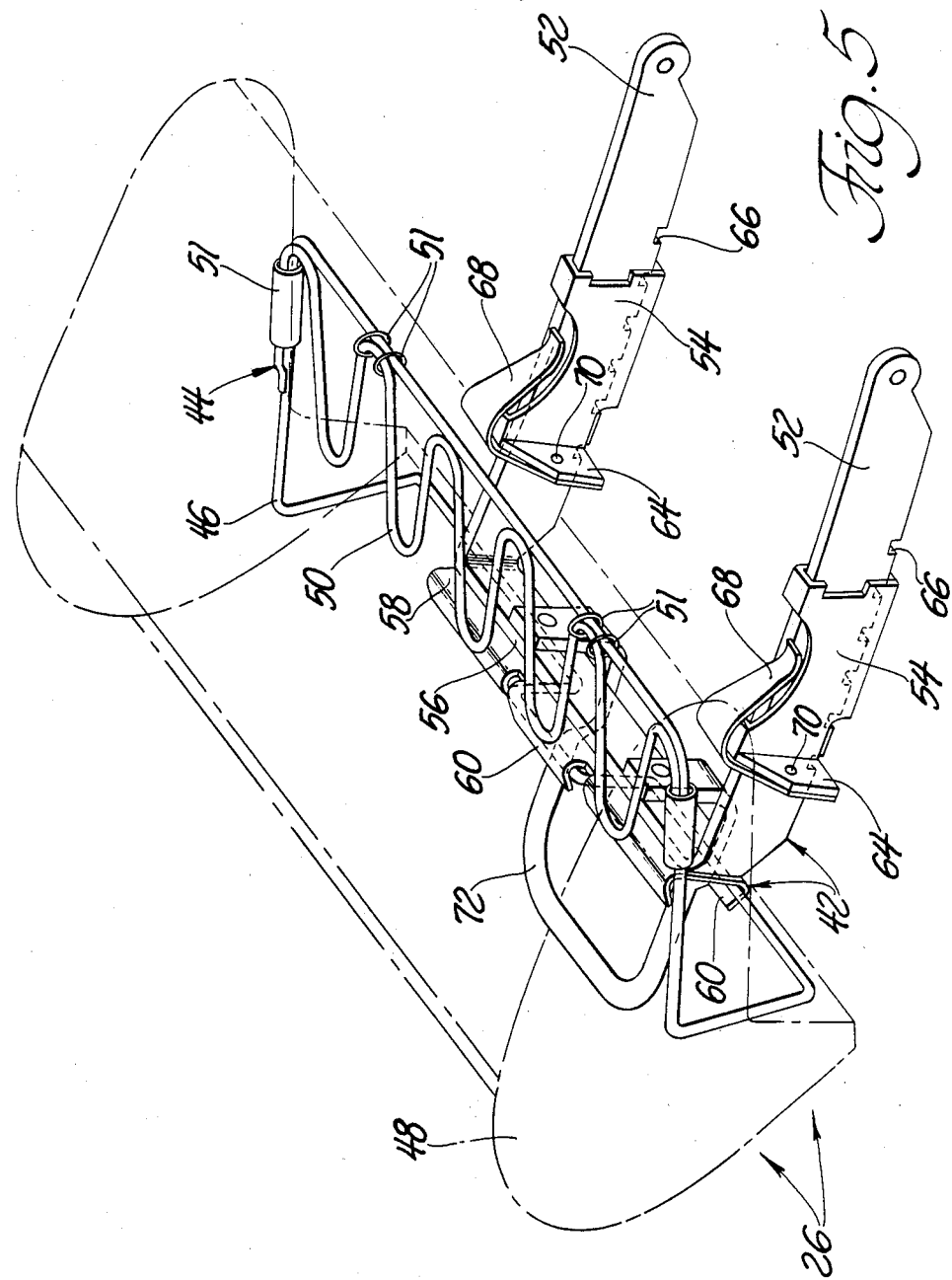

4,664,444

SEAT ASSEMBLY HAVING ADJUSTABLE THIGH SUPPORT

TECHNICAL FIELD

This invention relates to vehicle seats and, more particularly, to vehicle seats having an independently adjustable front thigh support.

BACKGROUND ART

During prolonged periods of motor vehicle travel, the thighs of the person occupying a vehicle seat are subject to muscle fatigue which causes leg strain which, in turn, occasionally may develop into painful cramps. To increase the comfort of the seat occupant over a longer period of time, the front edge of the seat may be raised upwardly to provide a support for the thighs of the occupant. U.S. Pat. No. 4,324,431 discloses a slidably adjustable thigh support for a vehicle seat which is positively supported during movement of the thigh support to any desired position between a fully extended position and a fully retracted position.

An additional automotive seat construction having an independently supported thigh support section which may be raised upwardly is shown by the U.S. Pat. to Lohr No. 3,600,037. This patent discloses a thigh support bolster section supported on a shaft extending longitudinally through the bolster section and also supported for rotation within supports of the seat molding. The shaft is formed in two sections which are connected by a friction clutch which normally secures the bolster section against pivotal movement.

STATEMENT OF INVENTION AND ADVANTAGES

According to the subject invention, there is provided a seat assembly comprising the seat portion and back rest supported on a seat frame and a thigh support means movably supported forward of the seat portion for supporting the thighs of an occupant. This thigh support means includes a support portion extending from the seat frame and a bolster supported by the support portion. The invention is characterized by spring means resiliently interconnecting the support portion and the bolster for allowing movement of the entire bolster relative to the support portion.

An advantage of this invention is a thigh support which will springably support the thighs of an occupant.

Another advantage of the present invention is that support and bolster portions are respectively interconnected in a resilient fashion for allowing movement of the entire bolster relative to said support portion.

FIGURES IN THE DRAWINGS

Other advantages of the present invention will be readily appreciated as the same becomes better understood by reference by the following detailed description when considered in connection with the accompanying drawings wherein:

FIG. 5 is a perspective view of the bolster and support portions shown in relation to one another in accordance with the subject invention.

DETAILED DESCRIPTION OF THE DRAWINGS

Figure 1:
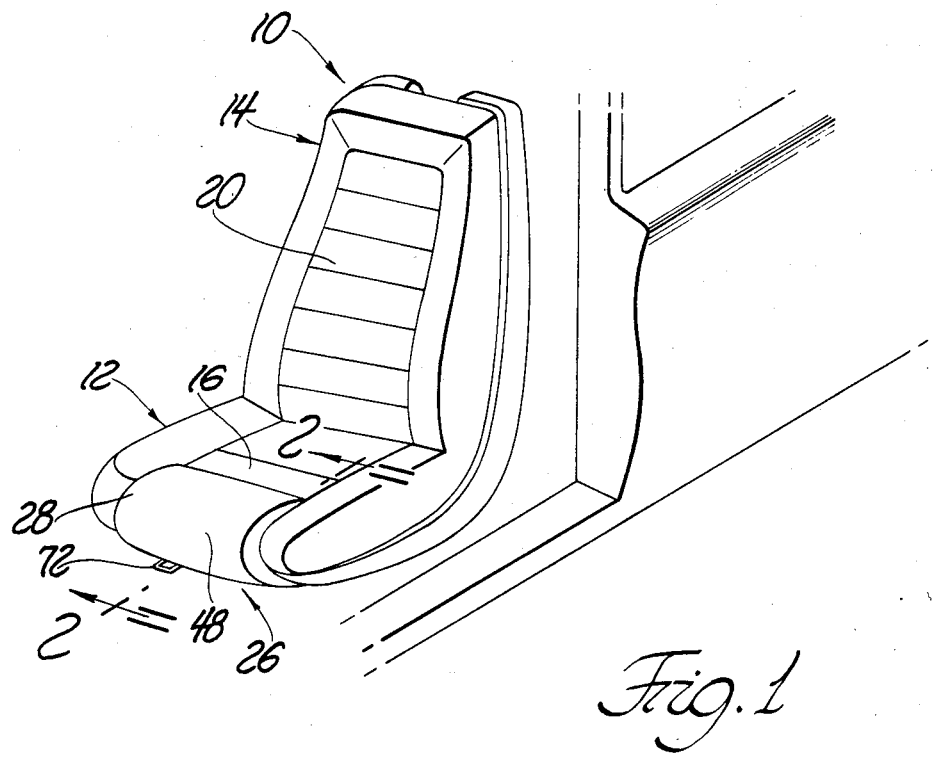
FIG. 1 is a perspective view of a seat assembly embodying the present invention and illustrating the bolster portion in a retracted position.

Referring to FIG. 1, a seat assembly constructed according to the present invention is generally shown at 10. The seat assembly comprises a seating portion, generally indicated at 12, and a back rest, generally indicated at 14 and pivotally secured thereto in a suitable manner. The seating portion 12 includes a bottom cushion 16 and the back rest portion 14 includes a back cushion 20.

With further reference to FIG. 1, an adjustable thigh support constructed in accordance with the subject invention is generally shown at 26. The thigh support 26 is shown in the fully retracted position; however, it may be extended or retracted with respect to the front of the seating portion 12 as will be described below.

Figure 2:
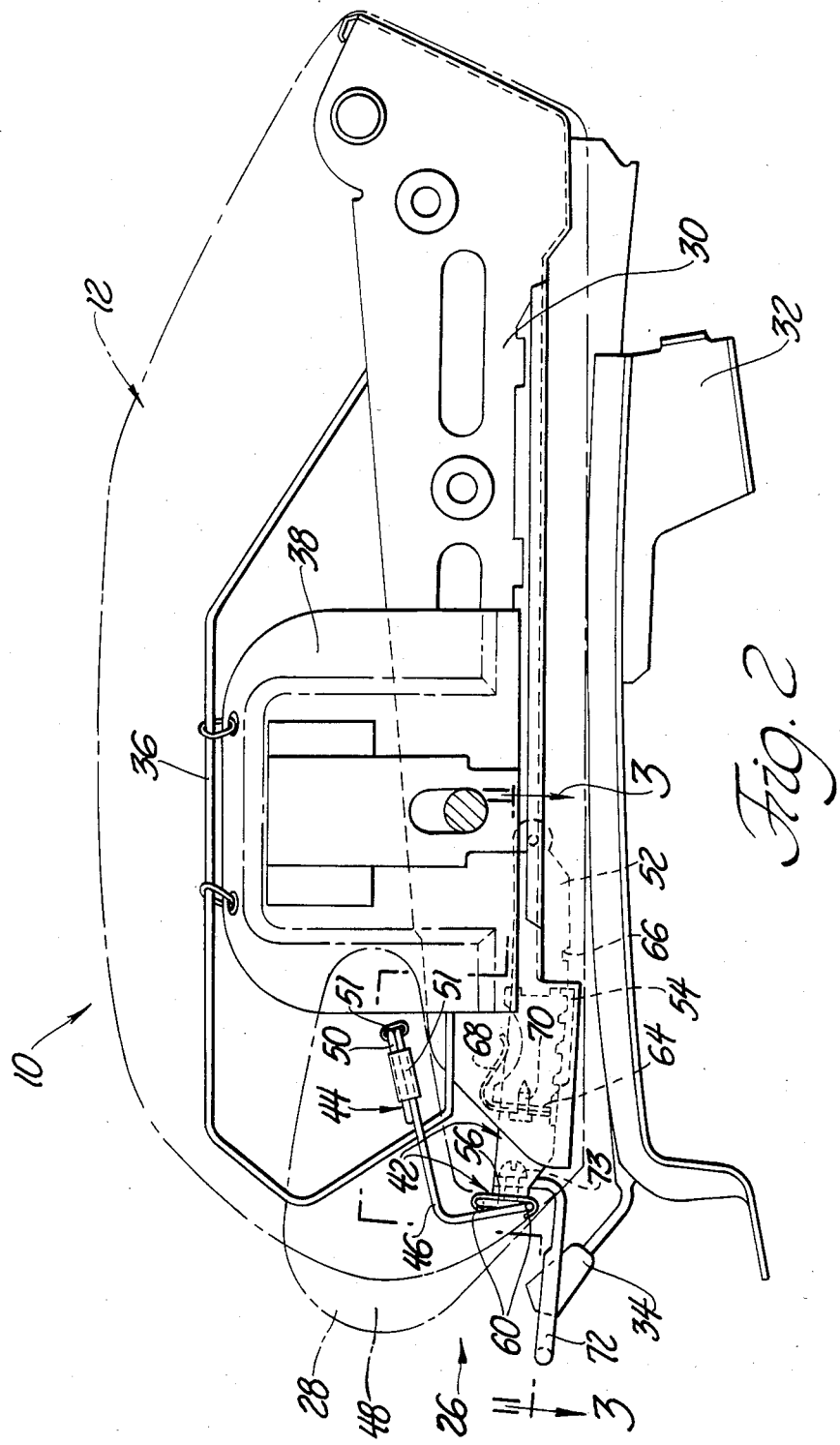
FIG. 2 is a side-elevational view of the bolster and support portions constructed in accordance with the subject invention in combination with a seat portion.

FIG. 2 illustrates in greater detail the relationship of the thigh support 26 to the remainder of the seat assembly 10. The seating portion 12 is supported by a frame 30 slidably engaging an under carriage secured to the floor board, thus allowing the entire seat assembly 10 to slide back and forth in a conventional manner. A seat adjustable lever 34 releases the above seat adjustment mechanism, allowing the occupant to vary the position of the seat.

The thigh support means 26 includes a support portion, generally indicated at 42, and a bolster or cushion portion 28 supported by the support portion 42. The assembly 10 is characterized by spring means, generally indicated at 44, resiliently interconnecting the support portion 42 and the bolster 26 for allowing movement of the entire bolster 26 relative to said support portion 42. The spring means 44 further includes at least one leaf spring 46 supporting the bolster portion 26 in a cantilevered fashion from the support portion 42. The bolster 26 includes an elongated cushion 48, preferably with one of said leaf springs 46 disposed adjacent each end thereof. From the aforesaid, it should be appreciated that either a single or any plurality of leaf springs 46, such as the pair shown in the FIGURES, may be utilized to support the bolster portion 26 in a cantilevered fashion from the support portion 42. A sinuous spring 50 is disposed in the cushion 48 for support thereof, extending between the pair of leaf springs 46. The sinuous spring 50 is secured by straps 51 to each of said leaf springs 46, which comprise a length of wire extending from the support 42 and into the cushion 48 and between the ends thereof.

Figure 3:
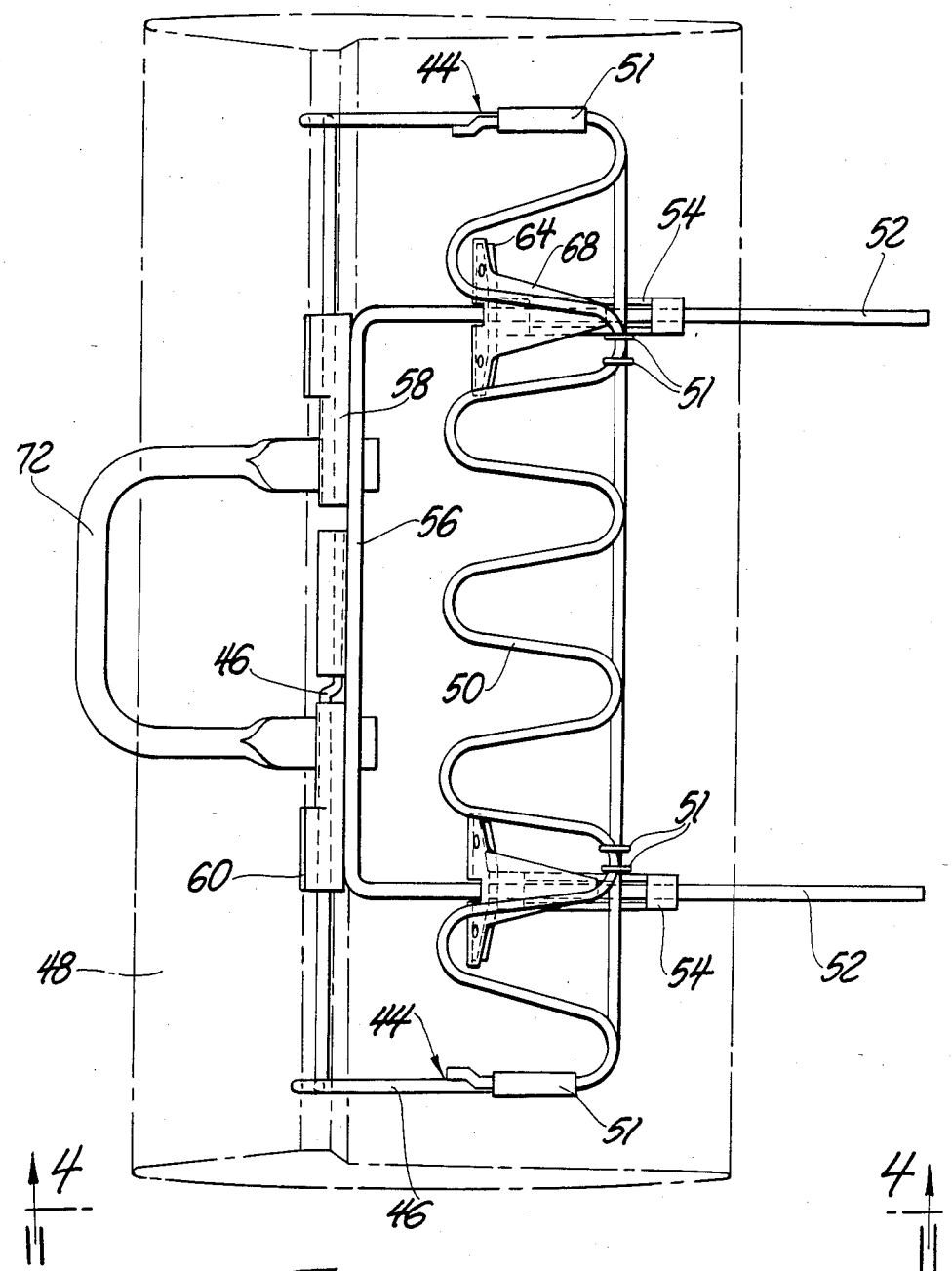
FIG. 3 is a top plan view of the bolster and support portions constructed in accordance with the subject invention.

The support 42 comprises at least one but preferably a pair of slideways 52 slidably engaging corresponding ones of said slide members 54 secured to the frame structure 30, defining a slide path for the bolster 28, allowing the bolster 28 to extend from a fully extended to a fully retracted position. A transverse plate 56 extends between and interconnects adjacent ends of the slideways 52. The slideways 52 and the plate 56 preferably are formed together to define an integral U-shaped collar member as shown in FIGS. 3 and 5.

The leaft springs 46 are retained on the support 42 by a retainer bracket 58 elongated in the direction of the plate 56 and having the top and bottom edges thereof bent inwardly to form flanges or tangs 60, said bracket 58 and tangs 60 all comprising retainer means for fixedly retaining said leaf springs 46 on the support plate 56.

Figure 4:
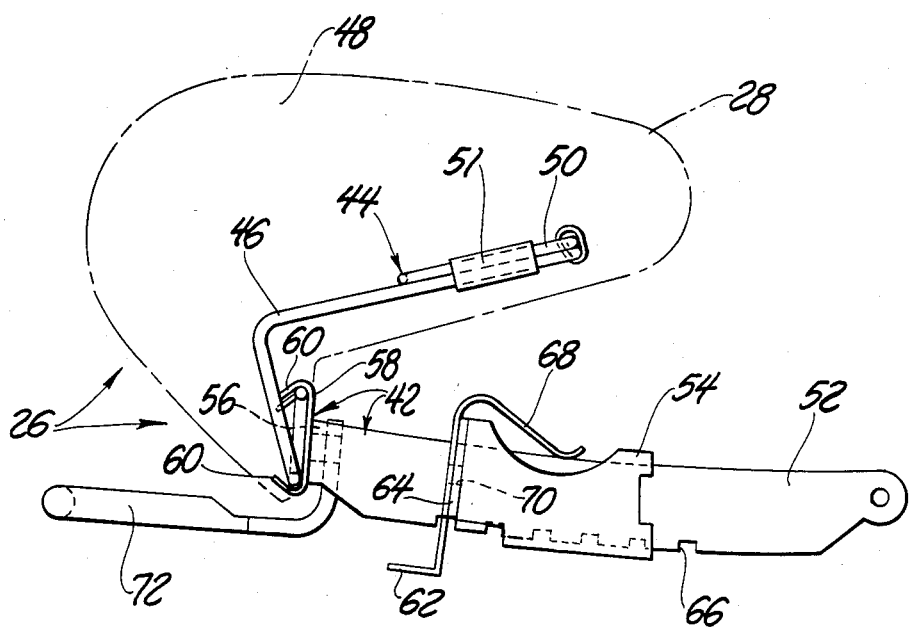
FIG. 4 is an end view taken substantially along lines 4—4 of FIG. 3.

The pair of slideways 52 and corresponding ones of said slide members 54 are locked against relative movement by locking means 62. The locking means 62 include a stop 64 extending from the seat structure 30 and a series of teeth 66 (shown in phantom in FIGS. 2, 4 and 5) spaced along each of the slideways 52, said teeth 66 being selectively engageable with said stop 64. In addition to the forces of gravity, additional biasing means for maintaining each of the locking means 62 in a locked position comprise an elastic finger 68 secured to each of the slide members 54 by a suitable fastener 70 bent to tensibly engage the top of an associated slideway 52, thereby biasing said teeth 66 downwardly into engagement with said stop 64. Adjustment means for adjusting the position of the bolster 28 relative to the support 42 includes a handle 72, affixed to the bracket 56 and plate 58 by a suitable fastener 73 (shown in phantom in FIG. 2), liftable to unlock the locking means 62 to move the slideways 52 along the slide path to a desired position whereupon the handle 72 may be lowered to again lock the locking means 62.

Of course, the pair of slideways could be replaced by a single slideway having a suitably constructed associated slide member, locking means and biasing means.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

The embodiment of the invention in which an exclusive property or privilege is claimed are defined as follows:

1. A seat assembly (10) comprising; a seat portion portion (12) and back rest (14) supported on a seat frame (30), a thigh support means (26) movably supported forward of said seat portion (12) for supporting the thighs of an occupant, said thigh support means (26) including a support portion (42) extending from said seat frame (30) and a bolster (28) supported by said support portion (42), spring means (44) resiliently interconnecting said support portion (42) and said bolster (28) for allowing movement of the entire bolster (28) relative to said support portion (42), said spring means (44) comprising at least one leaf spring (46) extending in a cantilevered fashion from said support portion (42) for bending along the length of said leaf spring (46) to provide the sole support for said bolster portion (28).

2. An assembly as set forth in claim 1 further characterized by said bolster (28) including an elongated cushion (48) with one of said leaf springs (46) disposed adjacent each end thereof.

3. An assembly as set forth in claim 2 further characterized by a sinuous spring (50) disposed in said cushion (48) and extending between said leaf springs (46).

4. An assembly as set forth in claim 3 further characterized by said leaf springs (46) comprising a length of wire extending from said support (42) and into said cushion (48) and between the ends thereof.

5. An assembly as set forth in claim 4 further characterized by said support (42) comprising at least one slideway (52) and corresponding slide member (54) secured to said frame structure, defining a slide path for said bolster (28) allowing said bolster (28) to extend from a fully extended to a fully retracted position.

6. An assembly as set forth in claim 5 further characterized by a pair of said slideways (52) and corresponding ones of said slide members (54).

7. An assembly as set forth in claim 6 further characterized by a transverse plate (56) extending between and interconnecting adjacent ends of said slideways (52).

8. An assembly as set forth in claim 7 further characterized by said slideways (52) and said plate (56) being defined by an integral U-shaped collar.

9. An assembly as set forth in claim 5 further characterized by retainer means (58, 60) for fixedly retaining said leaf springs (46) on said support (42).

10. An assembly as set forth in claim 5 further characterized by locking means (62) for locking said slideway (52) and slide member (54) against relative movement.

11. An assembly as set forth in claim 10 further characterized by a pair of said slideways (52) and corresponding ones of said slide members (54) each having said locking means (62) associated therewith.

12. An assembly as set forth in claim 10 further characterized by said locking means (62) including a stop (64) and a series of teeth (66) spaced along each of said slideways (52) and selectively engageable with an associated one of said stops (64).

13. An assembly as set forth in claim 12 further characterized by said locking means (62) including biasing means (64, 68, 70) for maintaining said locking means (62) in a locked position.

14. An assembly as set forth in claim 10 further characterized by adjustment means (62, 64, 66, 72) for adjusting the position of said bolster (28) relative to said support 42.

15. An assembly as set forth in claim 14 further characterized by said adjustment means (62, 64, 66, 72) comprising a handle (72) liftable to unlock said locking means (62) to move said slideway (52) along said slide path to a desired position thereupon lowering said handle (72) to lock said locking means (62).

16. A seat assembly (10) comprising: a seat portion (12) and back rest (14) supported on a seat frame (30); a bolster portion (28) movably supported forward of said seat portion (12) for supporting the thighs of an occupant; a support portion (42) extending from said seat frame (30) and supporting said bolster (28), said support portion (42) comprising at least one slideway (52) and cooperating slide member (54); at least one leaf spring (46) supporting said bolster portion (28) in a cantilevered fashion from said support portion (42), allowing movement of the entire bolster (28) relative to said support portion (42); a retainer bracket (58) having tangs (60) for retaining said leaf spring (46) on said support portion (42); locking teeth (66) spaced along said slideway (52) and engageable with a stop (64) on said slide member (54) to selectively lock said slideway (52) and slide member (54) against relative movement; an elastic finger (68) tensibly engaging the top of said slideway (52) to engage said teeth (66) with said stop (64); an adjuster (72) operatively connected to said support portion (42) and maneuverable to disengage and engage said teeth (66) from said stop (64) to move said slideway (52) relative to said slide member (54) to adjust the position of said thigh support (26).

17. An assembly as set forth in claim 16 further characterized by a pair of slideways (52) and corresponding ones of said slide members (54) supporting said bolster (28) with one of said leaf springs (46) disposed adjacent each end of said bolster (28) and a sinuous spring (50) disposed in said bolster (28) and extending between said leaf springs (62).

18. A seat assembly (10) comprising; a seat portion (12) and backrest (14) supported on a seat frame (30), a thigh support means (26) movably supported forward of said seat portion (12) for supporting the thighs of an occupant, said thigh support means (26) including a support portion (42) extending from said seat frame (30) and a bolster (28) supported by said support portion (42), spring means (44) resiliently interconnecting said support portion (42) and said bolster (28) for allowing movement of the entire bolster (28) relative to said support portion (42), said spring means (44) characterized by at least one leaf spring (46) supporting said bolster portion (28) in a cantilevered fashion from said support portion (42), said support (42) comprising at least one slideway (52) and corresponding slide member (54) secured to said frame structure and defining a slide path for said bolster (28) for allowing said bolster (28) to extend from a fully extened to a fully retracted position, and a traverse plate (56) extending between and interconnecting adjacent ends of said slideway (52) and retainer means (58, 60) for fixedly retaining said leaf springs (46) on said support portion (42), said retainer means (58, 60) comprising a bracket (58) mounted on said plate (56) and having a plurality of tangs (60) projecting outwardly therefrom to retain said leaf springs (46) therebetween.

19. A seat assembly (10) comprising; a seat portion (12) and backrest (14) supported on a seat frame (30), a thigh support means (26) movably supported forward of said seat portion (12) for supporting the thighs of an occupant, and thigh support means (26) including a support portion (42) extending from said seat frame (30) and a bolster (28) supported by said support portion (42), spring means (44) resiliently interconnecting said support portion (42) and said bolster (28) for allowing movement of the entire bolster (28) relative to said support portion (42), said spring means (44) comprising at least one leaf spring (46) extending in a cantilevered fashion from said support portion (42) for bending along the length of said leaf spring (46) to provide the sole support for said bolster portion (28), said support portion (42) comprising at least one slideway (52) and corresponding slide member (54) secured to said frame structure and defining a slide path for said bolster (28) for allowing said bolster (28) to extend from a fully extended to a fully retracted position, and characterized by locking means (62) for locking said slideway (52) and slide member (54) against relative movement, said locking means (62) including a stop (64) and a series of teeth (66) spaced along each of said slideways (52) and selectively engageable with an associated one of said stops (64) and including biasing means (64, 68, 70) for maintaining said locking means (62) in a locked position, said biasing means (64, 68, 70) including an elastic finger (68) secured to said slide member (54) and bent to tensibly engage the top of an associated one of said slideways (52) and biasing one of said teeth (66) into engagement with an associated one of said stops (64).

20. An assembly as set forth in claim 19 further characterized by adjustment means (62, 64, 66, 72) for adjusting the position of said bolster (28) relative to said support (42).

21. An assembly as set forth in claim 20 further characterized by said adjustment means (62, 64, 66, 72) comprising a handle (72) liftable to unlock said locking means (62) to move said slideways (52) along said slide path to a desired position thereupon lowering said handle (72) to lock said locking means (62).

* * * * *